(12) United States Patent
Shimazu

(10) Patent No.: US 10,401,065 B2
(45) Date of Patent: Sep. 3, 2019

(54) EXPANSION VALVE, AND REFRIGERATION CYCLE SYSTEM USING EXPANSION VALVE

(71) Applicant: Mitsubishi Electric Corporation, Tokyo (JP)

(72) Inventor: Yusuke Shimazu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 21 days.

(21) Appl. No.: 15/508,196

(22) PCT Filed: Oct. 8, 2014

(86) PCT No.: PCT/JP2014/076918
§ 371 (c)(1),
(2) Date: Mar. 2, 2017

(87) PCT Pub. No.: WO2016/056077
PCT Pub. Date: Apr. 14, 2016

(65) Prior Publication Data
US 2017/0307268 A1    Oct. 26, 2017

(51) Int. Cl.
*F25B 41/06* (2006.01)
*F16K 47/04* (2006.01)

(52) U.S. Cl.
CPC ............ *F25B 41/062* (2013.01); *F16K 47/04* (2013.01); *F25B 41/06* (2013.01); *F25B 2500/12* (2013.01)

(58) Field of Classification Search
CPC .... F25B 41/062; F25B 41/06; F25B 2500/12; F25B 2500/13; F16K 47/04; F28D 7/106; F04B 39/0072
(Continued)

(56) References Cited

U.S. PATENT DOCUMENTS

| | | | |
|---|---|---|---|
| 2009/0019871 A1 | 1/2009 | Yukimoto | |
| 2011/0185754 A1* | 8/2011 | Yamashita | ............... F24F 11/83 62/132 |
| 2013/0167571 A1* | 7/2013 | Nakagawa | ........... F24F 11/0008 62/176.4 |

(Continued)

FOREIGN PATENT DOCUMENTS

| | | |
|---|---|---|
| JP | 2000-356120 A | 12/2000 |
| JP | 2007-278625 A | 10/2007 |

(Continued)

OTHER PUBLICATIONS

International Search Report of the International Searching Authority dated Dec. 16, 2014 for the corresponding international application No. PCT/JP2014/076918 (and English translation).

(Continued)

*Primary Examiner* — Emmanuel E Duke
(74) *Attorney, Agent, or Firm* — Posz Law Group, PLC

(57) ABSTRACT

Provided is an expansion valve, including: a case having a valve chamber formed therein; and a valve element arranged in the valve chamber. The case includes: a side wall portion to which a first pipe is connected; and an end wall portion to which a second pipe is connected. The end wall portion has a fluid communication hole to be opened and closed by the valve element. The fluid communication hole is formed so that the following expression is satisfied: $L<\lambda/2$, where L represents an axial length of the fluid communication hole, and $\lambda$ represents a resonance wavelength.

10 Claims, 8 Drawing Sheets

(58) Field of Classification Search
USPC ...................................................... 236/92 B
See application file for complete search history.

(56) References Cited

U.S. PATENT DOCUMENTS

| | | | | |
|---|---|---|---|---|
| 2013/0175351 | A1* | 7/2013 | Kikuchi | ................ F25B 41/062 |
| | | | | 236/92 B |
| 2014/0083126 | A1* | 3/2014 | Shimazu | ................. F25B 41/06 |
| | | | | 62/324.6 |
| 2014/0283546 | A1* | 9/2014 | Wakisaka | .................. F16K 1/36 |
| | | | | 62/528 |

FOREIGN PATENT DOCUMENTS

| JP | 2008-232290 A | 10/2008 |
|---|---|---|
| JP | 2010-019406 A | 1/2010 |
| JP | 2012-067964 A | 4/2012 |
| JP | 2013-234726 A | 11/2013 |

OTHER PUBLICATIONS

Third Party Submission dated Nov. 1, 2017 issued in JP patent application No. 2016-552745 (and English translation).
Preliminary Notice of Reasons for Rejection dated Aug. 15, 2017 corresponding to JP patent application No. 2016-552745 (and English translation attached).
Office Action dated May 18, 2018 issued in corresponding CN patent application No. 201480082541.1 (and English translation).
Office action dated Mar. 15, 2019 issued in corresponding JP patent application No. 2018-076766 (and English translation thereof).

\* cited by examiner

◇R410A □R407C △R404A ×R32 ✶R1234yf ○R22 ◦CO2

◇R410A □R407C △R404A ×R32 ✶R1234yf ○R22

◇R410A □R407C △R404A ×R32 ✶R1234yf ○R22

EXPANSION VALVE, AND REFRIGERATION CYCLE SYSTEM USING EXPANSION VALVE

CROSS REFERENCE TO RELATED APPLICATIONS

This application is a U.S. national stage application of PCT/JP2014/076918 filed on Oct. 8, 2014, the contents of which are incorporated herein by reference.

TECHNICAL FIELD

The present invention relates to an expansion valve, and a refrigeration cycle system using the expansion valve.

BACKGROUND ART

A refrigeration cycle system includes at least a compressor, a condenser, an expansion valve, and an evaporator, as components of a refrigeration circuit. For example, as disclosed in Patent Literature 1, there has hitherto been used, as the expansion valve, an expansion valve configured to control a flow rate of refrigerant by opening and closing a fluid communication hole of the valve through use of a needle valve.

CITATION LIST

Patent Literature

[PTL 1] JP 2013-234726 A

SUMMARY OF INVENTION

Technical Problem

In the refrigeration cycle system, the expansion valve generally reduces pressure of high-pressure liquid refrigerant to change a state of the refrigerant into a low-pressure gas-liquid two phase having a low quality. In the expansion valve, a change in flow passage cross-sectional area is appropriately set to suppress rupture of cavitation and stabilize a refrigerant flow, thereby being capable of suppressing noise in a pipe on downstream.

However, in a typical refrigeration cycle, the two-phase state is provided on downstream of the expansion valve, and refrigerant in a bubble state is present even when no cavitation occurs. Thus, there is a case where the effect of suppressing noise through suppression of the rupture or cavitation cannot be highly expected.

Further, there is a case where low-pressure liquid refrigerant is provided on an expansion valve outlet side depending on, for example, operating conditions such as a state of outside air or conditions of the refrigerant circuit. In such a case, a sound velocity is higher than a velocity in the expansion valve. Thus, there is a risk that pressure pulsation on the outlet side propagates to the upstream reverse to the refrigerant flow and resonates in the expansion valve, with the result that a valve element and other components are vibrated to generate noise. Hitherto, no consideration has been made with respect to such noise caused by the pressure propagation, and there has been a problem in that a sufficient reduction effect cannot be obtained.

The present invention has been made in view of the problem described above, and has an object to provide an expansion valve capable of reducing noise in a case where refrigerant which flows into the expansion valve and refrigerant which flows out of the expansion valve are both liquid refrigerant.

Solution to Problem

In order to achieve the above-mentioned object, according to one embodiment of the present invention, there is provided an expansion valve, including a case having a valve chamber formed therein; and a valve element arranged in the valve chamber, the case including: a side wall portion to which a first pipe is connected; and an end wall portion to which a second pipe is connected, the end wall portion having a fluid communication hole to be opened and closed by the valve element, the fluid communication hole being formed so that the following expression is satisfied: $L<\lambda/2$, where L represents an axial length of the fluid communication hole, and $\lambda$ represents a resonance wavelength.

Further, in order to achieve the same object, according to one embodiment of the present invention, there is provided a refrigeration cycle system, including: a compressor; a heat-source heat exchanger; an expansion valve; and an indoor heat exchanger, the expansion valve including the above-mentioned expansion valve, which is provided in an indoor unit.

Advantageous Effects of Invention

According to the present invention, the noise can be reduced in the case where the refrigerant which flows into the expansion valve and the refrigerant which flows out of the expansion valve are both liquid refrigerant.

DESCRIPTION OF EMBODIMENTS

Figure 1:
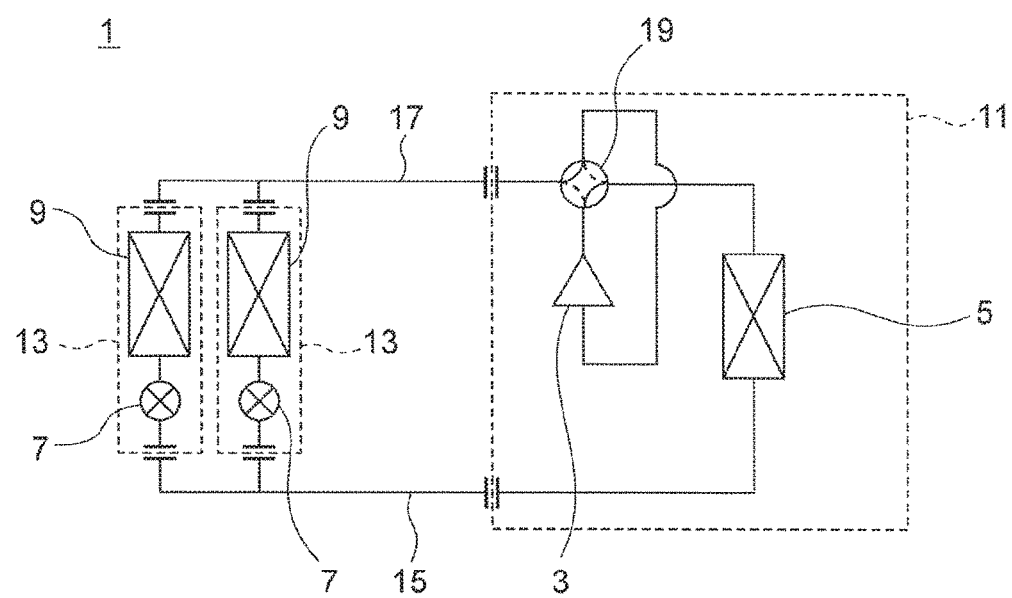
FIG. 1 is a diagram for illustrating a configuration of a refrigeration cycle system according to a first embodiment of the present invention.

Now, embodiments of the present invention are described with reference to the accompanying drawings. Note that, in the drawings, the same reference symbols represent the same or corresponding parts.

First Embodiment

FIG. 1 is a diagram for illustrating a configuration of a refrigeration cycle system according to a first embodiment of the present invention. The refrigeration cycle system 1 includes a compressor 3, a heat-source heat exchanger 5 being an outdoor heat exchanger, expansion valves 7, and indoor heat exchangers 9. In the specific configuration of FIG. 1, which is merely an example, there are illustrated one outdoor unit 11 and a plurality of indoor units 13.

The outdoor unit 11 is connected to each of the indoor units 13 through a liquid pipe 15 and a gas pipe 17. In the outdoor unit 11, there are arranged the above-mentioned compressor 3 and heat-source heat exchanger 5, and a four-way valve 19. In each of the indoor units 13, there are arranged the above-mentioned expansion valve 7 and indoor heat exchanger 9.

Next, operations of the above-mentioned refrigeration cycle system 1 are described.

(During Cooling Operation)

In FIG. 1, the four-way valve 19 provides a connection state as indicated by the solid lines. Refrigerant enters the compressor 3 under a state of being low-pressure gas and is compressed to become high-pressure gas. The heat-source heat exchanger 5 is a condenser, and condenses the refrigerant by transmitting energy of the refrigerant to a heat source (air or water) so that the refrigerant becomes high-pressure liquid refrigerant.

The refrigerant having flowed out of the heat-source heat exchanger 5 flows through the liquid pipe 15, passes through the expansion valves 7 to become low-pressure two-phase refrigerant, and enters the indoor heat exchangers 9. The indoor heat exchangers 9 are evaporators, and evaporate the refrigerant by absorbing energy of water or air on a load side so that the refrigerant becomes low-pressure gas. Meanwhile, the water or air having been subjected to the heat exchange is cooled. After that, the refrigerant flows through the gas pipe 17 and returns to the compressor 3. When the plurality of indoor units 13 are arranged, it is necessary to adjust a flow rate with respect to each indoor unit 13. In the illustrated example, a plurality of expansion valves 7 are also arranged.

(During Heating Operation)

In FIG. 1, the four-way valve 19 provides a connection state as indicated by the broken lines. The refrigerant enters the compressor 3 under the state of being low-pressure gas and is compressed to become high-pressure gas. The refrigerant passes through the gas pipe 17 to reach the indoor heat exchangers 9. The indoor heat exchangers 9 are condensers, and condense the refrigerant by transmitting energy of the refrigerant on the load side to the water or air so that the refrigerant becomes high-pressure liquid refrigerant. The water or air having been subjected to the heat exchange as heated.

Further, the refrigerant is reduced in pressure in the expansion valve 7 to be in a low-pressure two-phase state. The refrigerant passes through the liquid pipe 15 to reach the heat-source heat exchanger 5. The heat-source heat exchanger 5 is an evaporator, and evaporates the refrigerant by absorbing energy of the water or air on a heat source side so that the refrigerant becomes low-pressure gas. The water or air having been subjected to the heat exchange is cooled. After that, the refrigerant returns to the compressor. Also during the heating operation, when the plurality of indoor units 13 are arranged, it is necessary to adjust a flow rate with respect to each indoor unit 13. In the illustrated example, a plurality of expansion valves 7 are also arranged.

Figure 2:
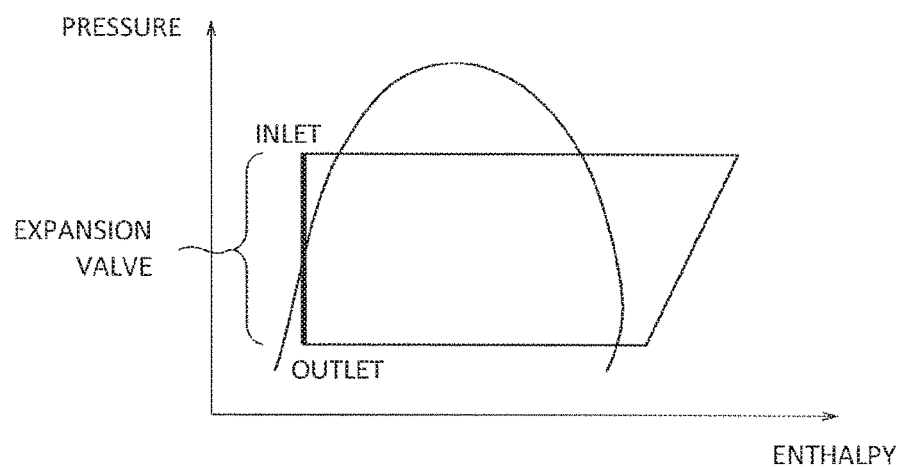
FIG. 2 is a Mollier chart for illustrating a state of a refrigeration cycle.

FIG. 2 is a Mollier chart for illustrating a state of the refrigeration cycle. Even when a temperature of water to be supplied is changed during the cooling operation and the heating operation, or the temperature of water to be supplied is changed on an indoor side or an outdoor side, the state of FIG. 2 is basically provided. The refrigerant is high-pressure liquid on an inflow side of the expansion valve 7, and the refrigerant is in a low-pressure two-phase state on an outflow side of the expansion valve 7.

Figure 3:
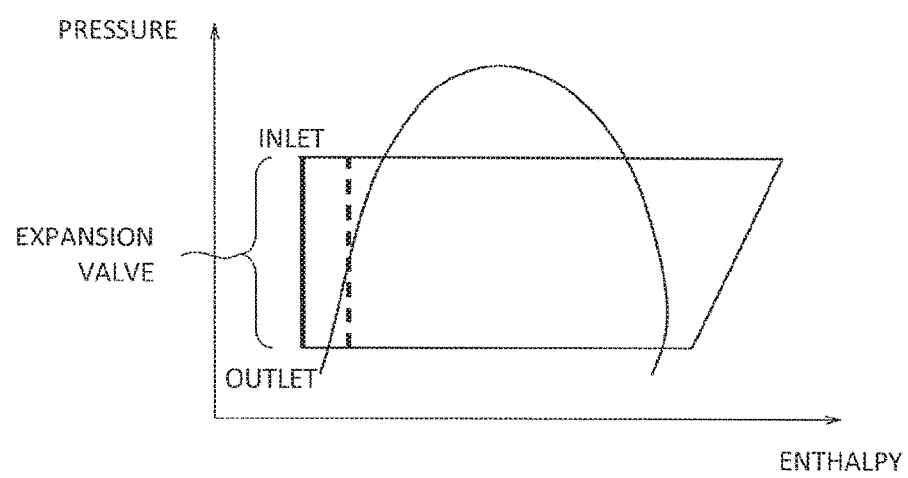
FIG. 3 is a Mollier chart for illustrating a cooling operation under a state in which an outside air temperature is lower as compared to FIG. 2.

However, in the refrigeration cycle system illustrated in FIG. 1, in a case of a cooling operation under a state in which an outside air temperature is low, a condenser outlet temperature is reduced so that the state of the refrigeration cycle illustrated in FIG. 3 is provided. An enthalpy at the inlet of the expansion valve is reduced, with the result that the refrigerant is in a liquid phase also at the outlet of the expansion valve. This is merely an example, and there is a case where liquid refrigerant is provided at the outlet of the expansion valve depending on a condition in which the refrigeration cycle system is installed.

Figure 4:
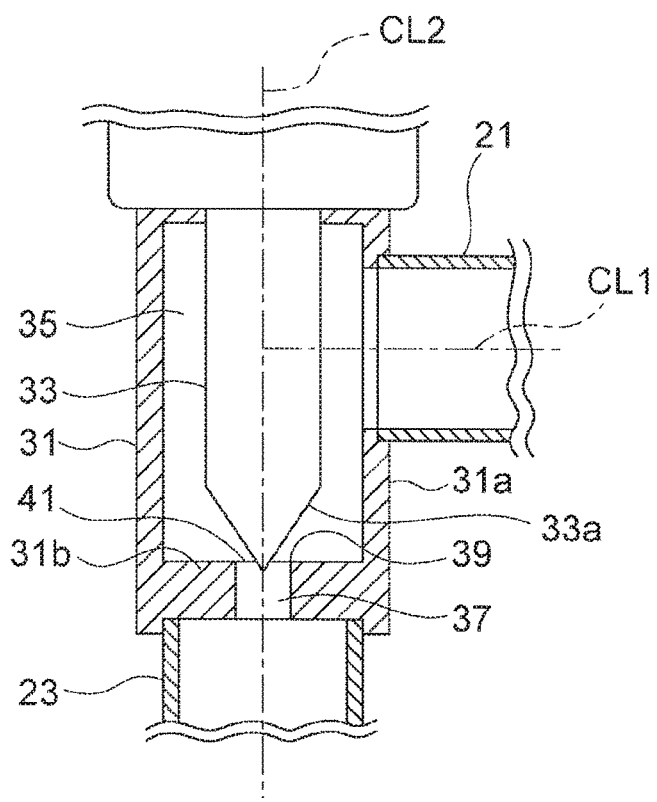
FIG. 4 is a view for illustrating a configuration of an expansion valve.

Next, the above-mentioned expansion valve is described. FIG. 4 is a view for illustrating a configuration of the expansion valve. The expansion valve 7 is arranged between a first pipe 21 and a second pipe 23. That is, the first pipe 21 and the second pipe 23 are connected to the expansion valve 7.

The expansion valve 7 includes a case 31 and a valve element 33. The case 31 has a valve chamber 35 formed therein. The first pipe 21 is connected to a side wall portion 31a of the case 31 which defines the valve chamber 35. The side wall portion 31a has a through hole which provides communication between the valve chamber 35 and an internal space of the first pipe 21.

Meanwhile, the second pipe 23 is connected to an end wall portion 31h of the case 31 which defines the valve chamber 35. The end wall portion 31b has a fluid communication hole 37 which provides communication between the valve chamber 35 and an internal space of the first pipe 21.

The fluid communication hole 37, the valve chamber 35, the valve element 33, and a connection portion of the second pipe 23 have a common center line CL2. With the center line CL2 as a reference, the fluid communication hole 37 has a diameter smaller than a diameter of the connection portion of the second pipe 23 and a diameter of the valve chamber 35.

Meanwhile, a center line CL1 of a connection portion of the second pipe 23 intersects the common center line CL2 of the fluid communication hole 37, the valve chamber 35, the valve element 33, and the connection portion of the second pipe 23. In the illustrated example, the center line CL1 is orthogonal to the center line CL2.

The valve element 33 moves along the center line CL2 so as to be advanceable and retreatable with respect to the fluid communication hole 37.

The first pipe 21 and the second pope 23 are each formed of, for example, a copper pipe and connected to the case 31 through furnace brazing. The case 31 is formed by machining a cast product made of brass. An outer surface of the side wall portion 31a has a fitting portion for fitting with the first pipe 21. An outer surface of the end wall portion 31b has a fitting portion for fitting with the second pipe 23.

The valve element 33 is driven by a well-known driving device (not shown), which is arranged on top of the case 31, to move in an upward and downward direction (opening and closing direction). When the valve element 33 is moved in the downward direction (valve-closing direction) to be brought into contact with the case 31, that is, to be brought into contact with the end wall portion 31b, the valve element 33 cannot move further in the downward direction. Such a part of the end wall portion 31b to which the valve element. 33 is to be brought into contact is a valve seat 39.

An end portion 33a of the valve element 33 on a fluid communication hole side has a smaller diameter at a position closer to the second pipe 23 side, or is tapered. In the illustrated example, the end portion 33a has a conical shape.

The fluid communication hole 37 is a hole having a columnar shape. Further, the valve seat 39 may have a circular shape which is an ideal geometrical shape, a truncated conical surface shape formed by chamfering an orifice, or an actual curved surface which is formed through contact with the valve element.

With such a shape of the end portion 33a of the valve element 33 and a shape of the fluid communication hole 37, when the valve element 33 is moved in the opening and closing direction, a passage area at a contracted portion 41 of an annular small passage is changed.

Further, with reference to FIG. 5 to FIG. 8, the fluid communication hole is described. In the above-mentioned configuration, it is assumed that the second pipe 23 is an outflow side from the expansion valve 7 and that the refrigerant in the second pipe 23 is in a liquid phase. The liquid refrigerant flows into the expansion valve 7 from the first pipe 21. The refrigerant moves from the valve chamber 35 through the fluid communication hole 37 to the second pipe 23 but maintains the liquid phase. There is a case where a few bubbles are generated due to cavitation, but a ratio of gas is very small. When the refrigerant reaches the second pipe 23 through the fluid communication hole 37, the flow passage area is changed discontinuously. As a result, a vortex is generated, and pressure pulsation occurs.

Herein, in a case where the refrigerant at the expansion valve outlet is in the gas-liquid two phase, the refrigerant is reduced in pressure at a contracted flow passage which is formed of the valve element and the valve seat of the expansion valve to be in the gas-liquid two phase. In the gas-liquid two phase, the gas refrigerant has remarkably lower density than the liquid phase, with the result that the velocity is high. The sound velocity in the gas-liquid two phase is remarkably lower than the sound velocity in the liquid refrigerant. Thus, velocity>sound velocity is satisfied. The rupture of cavitation which may occur on downstream of the contracted portion or pressure pulsation, which moves at the sound velocity, caused by rapid increase in flow passage area as in the related art do not hinder the refrigerant flow in the valve seat path. Therefore, the valve element of the expansion valve or peripheral components on upstream does not vibrate or generate noise.

In contrast, in a case where the refrigerant at the expansion valve outlet is in the liquid phase, the refrigerant is reduced in pressure in the contracted flow passage formed of the valve element and the valve seat of the expansion valve but is in the liquid phase. In the liquid phase, the density is remarkably higher than the density in the gas-liquid two phase, and hence the velocity is low. The sound velocity in the liquid phase is remarkably higher as compared to the sound velocity in the gas-liquid two phase. Thus, velocity<sound velocity is satisfied. As in the description of the related art, the rupture of cavitation which occurs on downstream of the contracted portion or the pressure pulsation, which moves at the sound velocity, caused by the rapid increase in flow passage area hinders the refrigerant flow in the valve seat path. At that time, when resonance occurs in the valve seat path, the valve element of the expansion valve and the peripheral components on upstream are vibrated, with the result that noise may be generated. Therefore, prevention of the resonance in the valve seat path is important in terms of quality.

Figure 5:
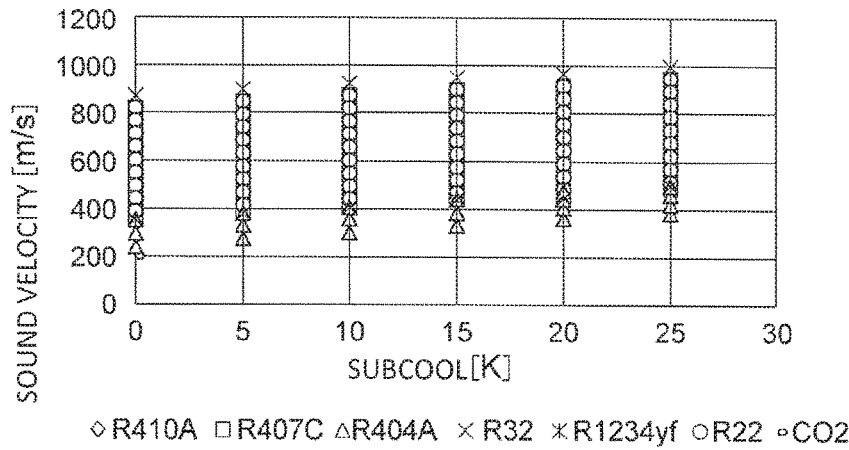
FIG. 5 is a graph for showing liquid sound velocities in cases where refrigerant and subcools are changed.
Figure 6:
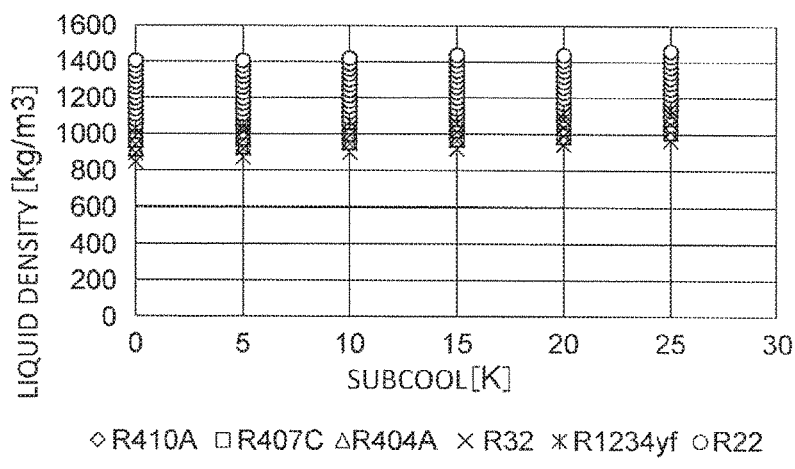
FIG. 6 is a graph for showing liquid densities in the cases where the refrigerant and the subcools are changed.
Figure 7:
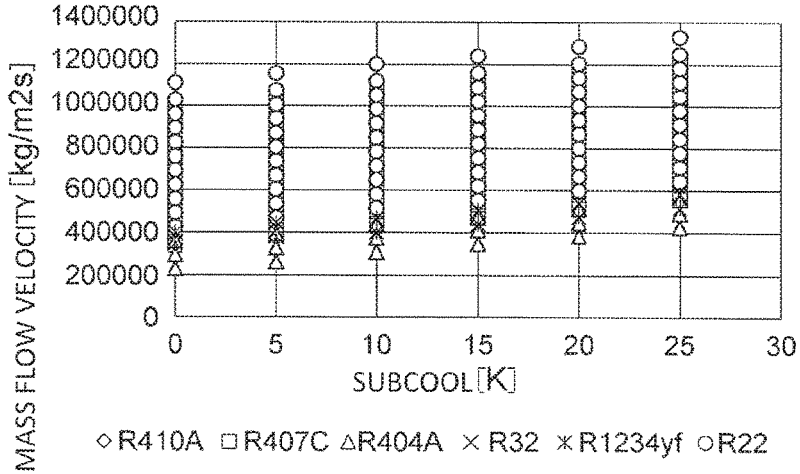
FIG. 7 is a graph for showing mass flow velocities in the cases where the refrigerant and the subcools are changed.

FIG. 5, FIG. 6, and FIG. 7 are graphs for showing liquid sound velocities, liquid densities, and mass flow velocities (=speed of sound at the liquid state×liquid density), respectively, in cases where refrigerant and subcools (=condensing temperature−condenser outlet temperature) are changed. In FIG. 5, FIG. 6, and FIG. 7, results obtained through use of software REFPROP (Ver. 9) are shown. With reference to FIG. 5 to FIG. 7, value ranges of the speed of sound at the liquid state, the liquid density, and the mass flow rate as a whole in modes having different refrigerant and subcools can be understood. For example, with reference to FIG. 5, the sound velocity in the liquid refrigerant ranges from 200 m/s to 1,000 m/s.

As can be understood from FIG. 7, the mass flow rate is at least $2 \times 10^5$ kg/m2s. When a fluid communication hole inner diameter D is set to 1 mm, a cross-sectional area is $7.85 \times 10^{-7}$, and a refrigerant circulation amount is 565 kg/h. In a typical refrigeration cycle system, it is substantially impossible to achieve the refrigerant flow rate of 565 kg/h with the expansion valve having a fluid communication hole inner diameter of 1 mm, and the velocity of the refrigerant which flows through the fluid communication hole of the expansion valve is lower than the sound velocity. That is, the pressure pulsation which has occurred on downstream of the fluid communication hole propagates reverse to the refrigerant flow to reach the valve element.

Figure 8:
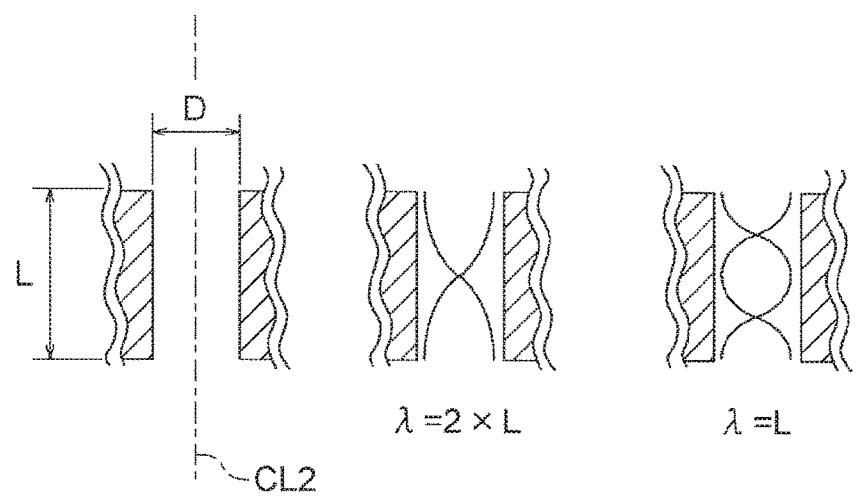
FIG. 8 is an illustration of a state of pressure propagation in a fluid communication hole.

In FIG. 8, a state of pressure propagation in the fluid communication hole is illustrated. The fluid communication hole inner diameter is represented by D, and an axial length, that is, dimension in a direction of the center line CL2 is represented by L. The fluid communication hole is opened at both the inlet side and the outlet side, and a condition in a case where a standing wave is generated is illustrated in a center portion of FIG. 8. When a resonance wavelength, that is, a wavelength in a case where the liquid refrigerant is transferred with a frequency close to a natural frequency of the expansion valve is represented by λ, and the fluid communication hole length L and a positive integer n are used, the following expression is satisfied:

$$(\lambda/2) \times n = L.$$

Thus, when the following expression is satisfied:

$$L < \lambda/2 \quad \text{(Expression 1)},$$

the standing wave is not generated, thereby preventing the resonance. When a frequency of the pressure pulsation is close to the natural frequency of the expansion valve, noise is liable to be generated from the expansion valve. However, the fluid communication hole is constructed so as to prevent the resonance in the fluid communication hole, thereby suppressing the noise from the expansion valve.

Further, with a sound velocity a of the refrigerant and a frequency f of pulsation, the following expression is satisfied:

$$L < \{a/(2f)\} \times n.$$

With reference to FIG. 5, the sound velocity in the liquid refrigerant ranges from 200 m/s to 1,000 m/s. A frequency band which is caught by auditory sensation ranges from 1 kHz to 20 kHz. Thus, the condition of causing the resonance in the fluid communication hole is expressed in the following expression:

$$200/(2 \cdot 20000) < L \le \{1000/(2 \cdot 1000)\} \times n.$$

There is no upper limit, but a lower limit is expressed in the following expression:

$$L < 0.005 \text{ m}.$$

In contrast, when the fluid communication hole length is expressed in the following expression:

$$L < 0.005 \text{ m} \quad \text{(Expression 2)},$$

the standing wave is not generated, thereby preventing the resonance. When the pressure pulsation occurs on downstream of the fluid communication hole to reach the valve element, a vibration source is too small to cause noise in the expansion valve. In the first embodiment, the fluid communication hole 37 is formed so that $L < \lambda/2$ is satisfied.

As described above, although description is repeated, the pressure pulsation does not cause resonance in the fluid communication hole. Thus, even when the pressure pulsation occurs on downstream of the fluid communication hole to reach the valve element, the vibration source is too small, thereby suppressing noise in the expansion valve. Further, the expansion valve is arranged inside of or in the vicinity of the indoor unit, thereby increasing the effect of reducing noise in terms of the auditory sensation.

The condition for resonance basically depends on the fluid communication hole length, but is also affected by the fluid communication hole inner diameter. In general, 4×D is added, which is generically named opening end correction (Rayleigh, J. W. S., "Theory of Sound"). However, the fluid communication hole is substantially not opened on upstream due to the influence of the valve element, and it is only necessary that the fluid communication hole is corrected on downstream. When the following expression is satisfied:

$$L + 0.4 \times D < \lambda/2 \quad \text{(Expression 3) or}$$

$$L + 0.4 \times D < 5 \text{ mm} \quad \text{(Expression 4)},$$

the standing wave is not generated, thereby preventing the resonance. Even when the pressure pulsation occurs on downstream of the fluid communication hole to read the valve element, the vibration source is too small to cause the noise in the expansion valve. When the fluid communication hole inner diameter is taken into consideration, and the fluid communication hole inner diameter is large, the effect of reliably suppressing the noise can be achieved.

Further, when $D < L$ is satisfied, the pressure propagation in the pressure fluid communication hole can be regarded as a plane wave. Therefore, as long as any one of Expression 1 to Expression 4 is satisfied, the noise in the expansion valve can be suppressed. In contrast, when $D \ge L$ is satisfied, the pressure propagation in the fluid communication hole reaches the valve element in a concentrated manner. Thus, there is a fear of increase in noise. In a case where the liquid refrigerant is provided on the expansion valve outlet side, when connection is made so that the first pipe is provided on the outlet side, the refrigerant passes through the contracted portion 41 of the annular small passage formed of the valve seat and the valve element and is diffused in the valve chamber, thereby reducing a risk of generating the standing wave. That is, the valve seat 39 is positioned on upstream of the fluid communication hole 37, and the flow velocity is reduced, with the result that the pressure fluctuation being a source of vibration or noise is less liable to occur. Thus, noise can be suppressed.

The above-mentioned four-way valve 19 is an example of a flow direction switching unit configured to switch a flow direction of the refrigerant to the expansion valve 7. In a first flow mode, the refrigerant flows into the expansion valve 7 from the first pipe 21, and then flows out of the expansion valve 7 into the second pipe 23. In a second flow mode, the refrigerant flows into the expansion valve 7 from the second pipe 23, and then flows out of the expansion valve 7 into the first pipe 21. The flow direction switching unit is configured to achieve switching between the first flow mode and the second flow mode.

The refrigerant need not be specified. However, slightly flammable refrigerants such as R32, R1234yf, and R1123 may reduce a risk of causing fatigue fracture in a pipe due to vibration, thereby being capable of reducing a risk of inflammation.

According to the above-mentioned first embodiment, the fluid communication hole is formed in the end wall portion to which the second pipe is connected, and is opened and closed by the valve element. The fluid communication hole is formed so that $L < \lambda/2$ is satisfied, where L represents the axial length of the fluid communication hole, and λ represents the resonance wavelength. Thus, the following advantages can be obtained. In a case where the liquid refrigerant flows in from the first pipe, and the liquid refrigerant flows out from the second pipe, the sound velocity in the liquid refrigerant is higher than the velocity of the liquid which passes through the fluid communication hole. Thus, the pressure pulsation which is caused by the vortex generated in the discontinuous path extending from the fluid communication hole to the second pipe reaches the valve element reverse to the refrigerant flow in the fluid communication hole. When the axial length of the fluid communication hole being the reversing path is smaller than the wavelength of the standing wave having open ends at both sides, the resonance does not occur. Thus, resonance with the natural frequency of the expansion valve and resulting generation of noise can be prevented.

Further, in a case where the fluid communication hole is formed so that $L + 0.4 \times D < \lambda/2$ is satisfied, even when the fluid communication hole inner diameter is large, noise can finely be suppressed. Further, in a case where the fluid communication hole is formed so that $L + 0.4 \times D < 5$ mm is satisfied, the expansion valve, which is a member having high rigidity, has a high natural frequency, and hence there can also be obtained an effect of suppressing noise caused by the resonance in the range of from 1 kHz to 20 kHz affecting the auditory sensation. Further, also in a case where the fluid communication hole is formed so that $L \ge D$ is satisfied, there can similarly be obtained the effect of suppressing noise caused by the resonance in the range of from 1 kHz to 20 kHz affecting the auditory sensation.

Further, in a case where the refrigerant flows into the valve chamber from the second pipe through the fluid communication hole, and the refrigerant flows out of the valve chamber into the first pipe, the valve seat is positioned on upstream of the fluid communication hole. Thus, the flow velocity is reduced, and the pressure fluctuation being a source of the vibration or noise is less liable to occur. Thus, noise can be suppressed.

Further, the indoor unit or the vicinity of the indoor unit is located close to a person. Thus, when a source of noise is present in the indoor unit or in the vicinity of the indoor unit, the noise is liable to be noticed. Thus, this embodiment can provide excellent effect particularly in a case where the above-mentioned expansion valve is arranged in the indoor unit.

Second Embodiment

Figure 9:
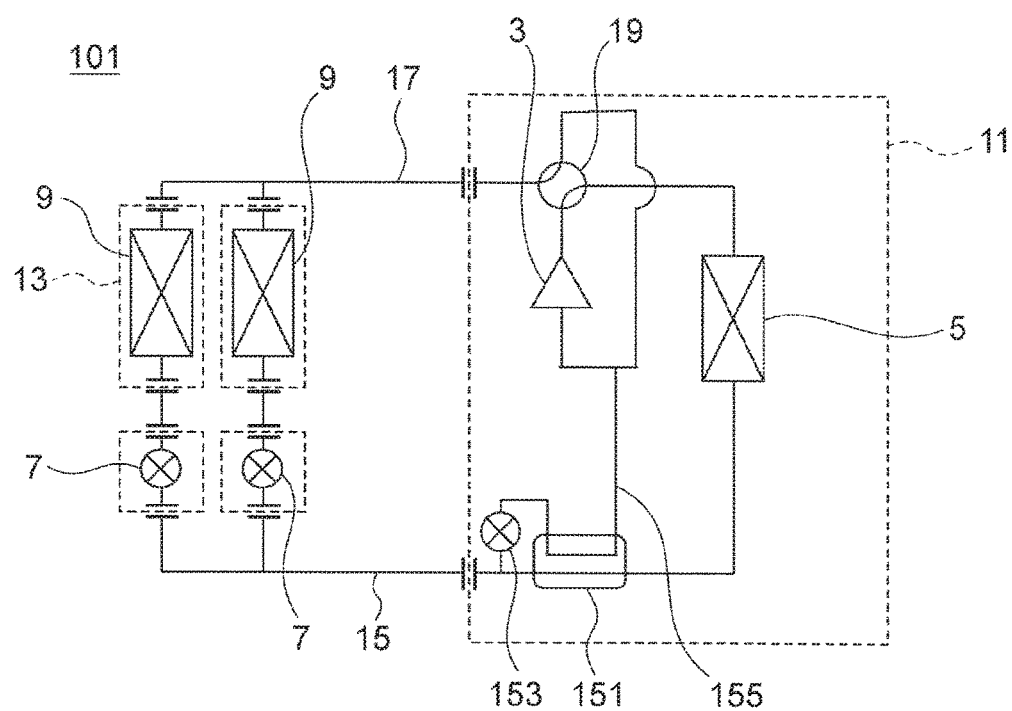
FIG. 9 is a diagram for illustrating a configuration of a refrigeration cycle system according to a second embodiment of the present invention.

Next, a second embodiment of the present invention is described. FIG. 9 is a diagram for illustrating a configuration of a refrigeration cycle system according to the second embodiment of the present invention. The refrigeration cycle system 101 includes the compressor 3, the heat-source heat exchanger 5, the expansion valves 7, and the indoor heat exchangers 9. In the specific configuration of FIG. 9, which is merely an example, there are illustrated the one outdoor unit 11 and the plurality of indoor units 13.

The outdoor unit 11 is connected to each of the indoor units 13 through the liquid pipe 15 and the gas pipe 17. In the outdoor unit 11, there are arranged the compressor 3, the heat-source heat exchanger 5, the four-way valve 19, a refrigerant heat exchanger 151, and a bypass adjustment valve 153. In each of the indoor units 13, there are arranged the indoor heat exchanger 9. Further, the expansion valve 7 is arranged in the vicinity of the indoor unit 13.

A bypass pipe 155 is arranged between an inlet side of the compressor 3 during the cooling operation and the liquid pipe 15. The bypass adjustment valve 153 is arranged on the bypass pipe 155. The refrigerant heat exchanger 151 is configured to perform heat exchange between the refrigerant which is present in a range of from the outlet side of the heat-source exchanger 5 to the inlet side of the expansion valve 7 during the cooling operation and the refrigerant which is present in the bypass pipe 155.

In the refrigeration cycle system 1 of FIG. 9, the expansion valves 7 are not arranged in the indoor units 13. However, the expansion valves 7 are connected to the branched liquid pipe 15. It is necessary to adjust the flow rate by controlling the expansion valves 7 in accordance with conditions of the indoor unit 13, for example, the difference between an intake air temperature and a set temperature (it is necessary to increase the flow rate when the difference is large) and the difference between a saturation temperature and a heat exchanger outlet temperature of the indoor heat exchangers 9, that is, indicators of the extent of effective use of the indoor heat exchanger Thus, in most cases, the expansion valves 7 are positioned close to the indoor units.

The refrigerant having flowed out of the condenser passes through a high-pressure side of the refrigerant heat exchanger. However, after the passage, a part of the refrigerant is reduced in pressure by the bypass adjustment valve to have a low temperature and further passes through a low-pressure side of the refrigerant heat exchanger. With this, heat exchange is performed between the high-pressure side and the low-pressure side having different temperatures. As a result, the high-pressure side is cooled, and the low-pressure side is heated. Thus, the enthalpy of the refrigerant which flows into the expansion valve 7 is reduced, thereby achieving the cyclic state as illustrated in FIG. 3. In this case, the refrigerant on the expansion valve outflow side is liquid refrigerant.

Also in such refrigeration cycle system 1, the action and effect similar to those of the above-mentioned first embodiment can be obtained through use of the expansion valve 7 described in the above-mentioned first embodiment.

Third Embodiment

Figure 10:
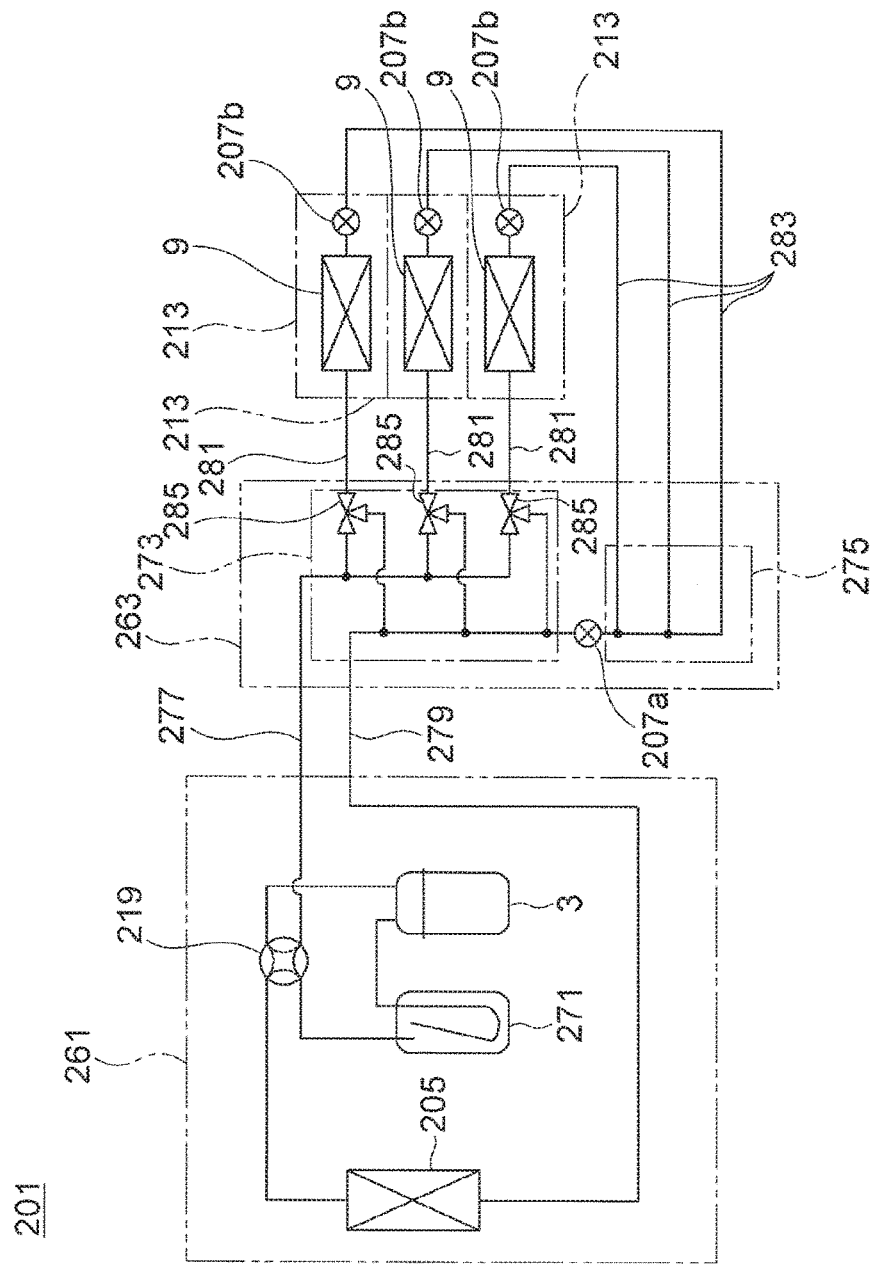
FIG. 10 is a diagram for illustrating a configuration of a refrigeration cycle system according to a third embodiment of the present invention.

Next, a third embodiment of the present invention is described. FIG. 10 is a diagram for illustrating a configuration of refrigeration cycle system according to the third embodiment. A refrigeration cycle system 201 includes the compressor 3, a heat-source heat exchanger 205, expansion valves 207a and 207b, and the indoor heat exchangers 9.

As an entire configuration, the refrigeration cycle system 201 includes a heat source device 261, a plurality of indoor units 213, and a relay device 263.

In the heat source device 261, there are arranged the compressor 3, the heat-source heat exchanger 205, a four-way valve 219, and an accumulator 271. In each of the indoor units 213, there are arranged the indoor heat exchanger 9 and an expansion valve (first flow rate control valve) 207b. The indoor heat exchanger 9 and the expansion valve 207b are connected in series. In the relay device 263, there are arranged a first branching portion 273, a second branching portion 275, and an expansion valve (second flow rate control valve) 207a.

The heat source device 261 and the relay device 263 are connected to each other through a heat source device-side first connection pipe 277 and a heat source device-side second connection pipe 279. The indoor units 213 are connected to the relay device 263 through outdoor unit-side first connection pipes 281 and outdoor unit-side second connection pipes 283.

The expansion valve 207a is arranged between the first branching portion 273 and the second branching portion 275. Further, in the second branching portion 275, there are arranged a plurality of three-way switching valves 285.

In the illustrated example, three indoor units 213 are arranged. In accordance with the number of indoor units 213 which are installed, there are arranged three outdoor unit-side first connection pipes 281, three outdoor unit-side second connection pipes 283, and three three-way switching valves 285.

One side (merging side) of the flow passages of the first branching portion 273 is connected to another side of the flow passage of the expansion valves 207b. Another side (branching side) of the flow passages of the first branching portion 273 is connected to one side of the flow passages of the indoor units 213 through the outdoor unit-side second connection pipes 283.

Another side of the flow passages of the indoor units 213 is connected to first flow passage ends of the three-way switching valves 285 through the outdoor unit-side first connection pipes 281. Second flow passage ends of the three-way switching valves 285 are connected to the heat source device-side first connection pipe 277, and are connected to one side of the flow passages of the heat source device 261 through the heat source device-side first connection pipe 277.

Another side of the flow passage of the heat source device 261 is connected to one side of the flow passages of the expansion valves 207b through the heat source device-side second connection pipe 279. Further third flow passage ends of the three-way switching valves 285 are connected to the heat source device-side second connection pipe 279.

Figure 11:
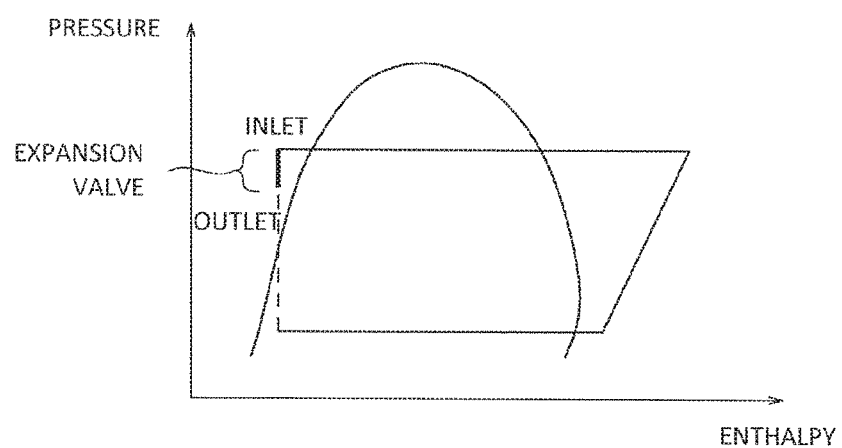
FIG. 11 is a chart relating to the refrigeration cycle system of the third embodiment, which is in the same form as FIG. 2.

In the case of the refrigeration cycle system illustrated in FIG. 10, the cooling operation by some indoor units and the heating operation by other indoor units can be achieved at the same time. In the indoor unit which performs the heating operation, high-pressure gas flows in, and the indoor heat exchanger functions as the condenser. Thus, high-pressure liquid refrigerant flows into the expansion valve. The refrigerant which flows out of the expansion valve further reaches the expansion valve of the indoor unit which performs the cooling operation, passes through the indoor heat exchanger, and becomes low-pressure gas. Thus, the refrigerant passes through two expansion valves. Accordingly, as illustrated in FIG. 11, the refrigerant having flowed out of the expansion valve of the indoor unit which performs the heating operation has a middle pressure which is intermediate pressure between high pressure and low pressure. Therefore, as compared to the case where the air temperature is changed in the refrigeration cycle system of FIG. 1, even when the change is smaller in the case where the air temperature is changed in the refrigeration cycle system of FIG. 10, the refrigerant on the outflow side of the expansion valve may be in the liquid phase According to the third embodiment, in such refrigeration cycle system 201, the action and effect similar to those of the above-mentioned first embodiment can be obtained through use of the expansion valve 7 illustrated in the above-mentioned first embodiment for some or all of the expansion valve 207a arranged in the relay device 263 and the expansion valves 207b arranged in the indoor units 213.

Although the details of the present invention are specifically described above with reference to the preferred embodiments, it is apparent that persons skilled in the art may adopt various modifications based on the basic technical concepts and teachings of the present invention.

REFERENCE SIGNS LIST 1, 101, 201 refrigeration cycle system,
3 compressor,
5, 205 heat-source heat exchanger,
7, 207a, 207b expansion valve,
9 indoor heat exchanger,
13, 213 indoor unit,
21 first pipe,
23 second pipe,
31 case,
31a side wall portion,
31b end wall portion,
33 valve element,
35 valve chamber,
37 fluid communication hole

The invention claimed is:

1. An expansion valve, comprising:
a case having a valve chamber formed therein; and
a valve element arranged in the valve chamber,
the case comprising:
   a side wall portion to which a first pipe is connected; and
   an end wall portion to which a second pipe is connected,
the end wall portion having a fluid communication hole to be opened and closed by the valve element,
the fluid communication hole is formed so that the following expression is satisfied:

$L < \lambda/2$, where L represents an axial length of the fluid communication hole, and λ represents a resonance wavelength, and
wherein the fluid communication hole is formed so that the following expression is satisfied:

$L + 0.4 \times D < \lambda/2$, where D represents an inner diameter of the fluid communication hole.

2. The expansion valve according to claim 1, wherein the fluid communication hole is formed so that the following expression is satisfied:

$L + 0.4 \times D < 5$ mm.

3. The expansion valve according to claim 2, wherein the fluid communication hole is formed so that the following expression is satisfied:

$L \geq D$.

4. The expansion valve according to claim 1, wherein the expansion valve is configured to receive refrigerant flowing into the valve chamber from the second pipe through the fluid communication hole and out of the valve chamber into the first pipe.

5. A refrigeration cycle system, comprising:
a compressor;
a heat-source heat exchanger;
an expansion valve; and
an indoor heat exchanger,
the expansion valve comprising the expansion valve according to claim 1, which is provided in an indoor unit.

6. An expansion valve, comprising:
a case having a valve chamber formed therein; and
a valve element arranged in the valve chamber,
the case comprising:
   a side wall portion to which a first pipe is connected; and
   an end wall portion to which a second pipe is connected,
the end wall portion having a fluid communication hole to be opened and closed by the valve element, and
the fluid communication hole having a columnar shape with an axial length and an inner diameter satisfying a relationship as follows:

$L + 0.4 \times D < \lambda/2$ where L represents the axial length of the fluid communication hole,
λ represents a resonance wavelength of the fluid communication hole, and
D represents the inner diameter of the fluid communication hole.

7. The expansion valve according to claim 6, wherein the fluid communication hole is formed so that the following expression is satisfied:

$L + 0.4 \times D < 5$ mm.

8. The expansion valve according to claim 7, wherein the fluid communication hole is formed so that the following expression is satisfied:

$L \geq D$.

9. The expansion valve according to claim 6, wherein the expansion valve is configured to receive refrigerant flowing into the valve chamber from the second pipe through the fluid communication hole and out of the valve chamber into the first pipe.

10. A refrigeration cycle system, comprising:
a compressor;
a heat-source heat exchanger;
an expansion valve; and
an indoor heat exchanger,
the expansion valve comprising the expansion valve according to claim 6, which is provided in an indoor unit.

* * * * *